Dec. 7, 1971  HANS-GEORG WASCHULEWSKI ET AL  3,625,074
ECCENTRIC VIBRATOR
Filed April 21, 1969  4 Sheets-Sheet 1
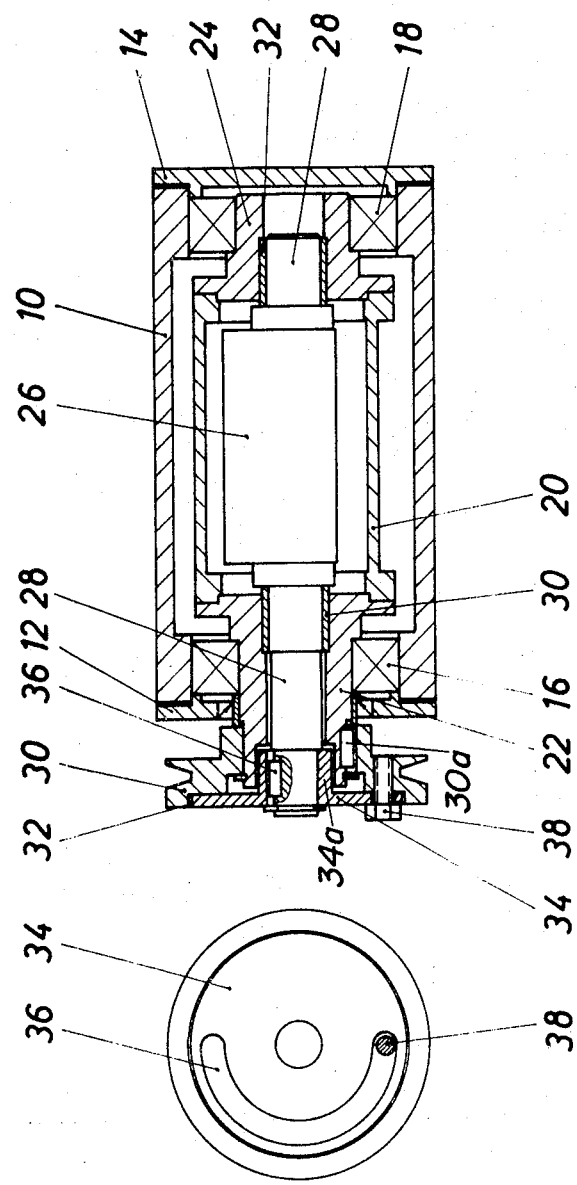
INVENTORS:
Hans-Georg Waschulewski
Helmut Erdmann
BY
Darby, Roberts & Vandenburgh
attys.

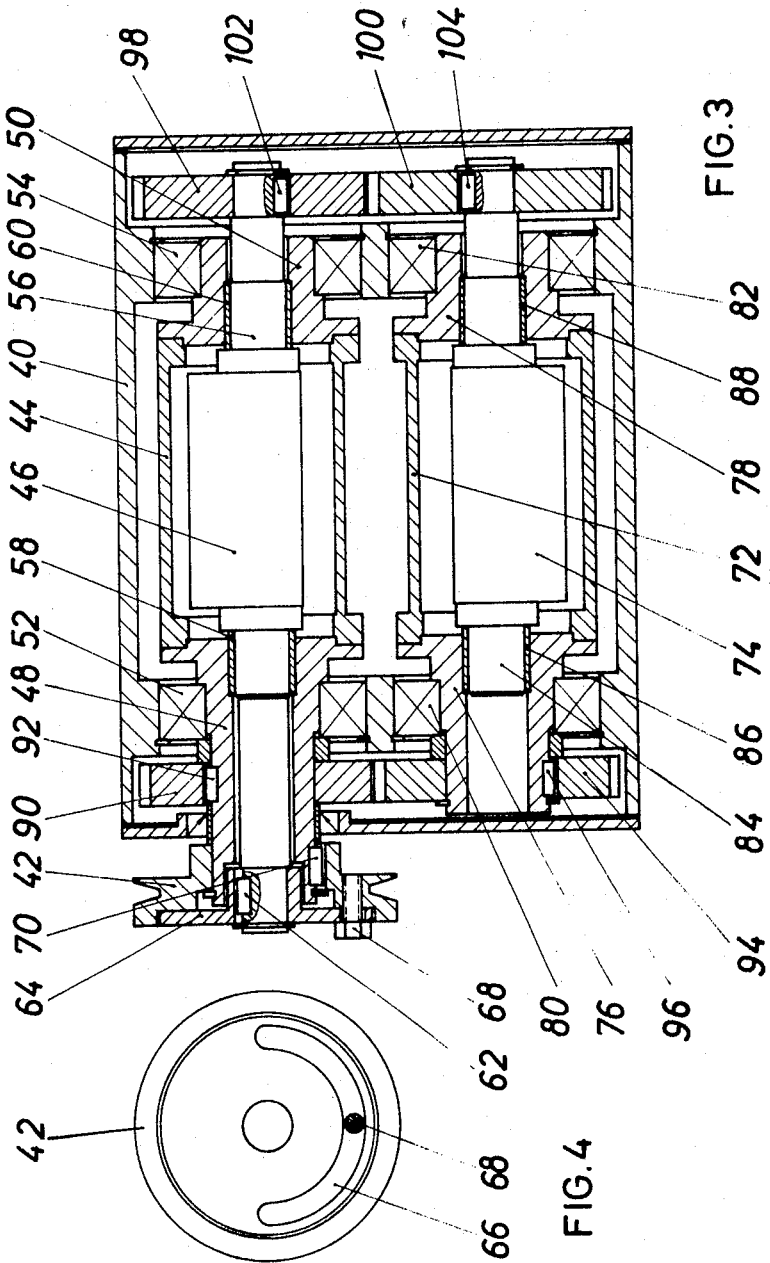

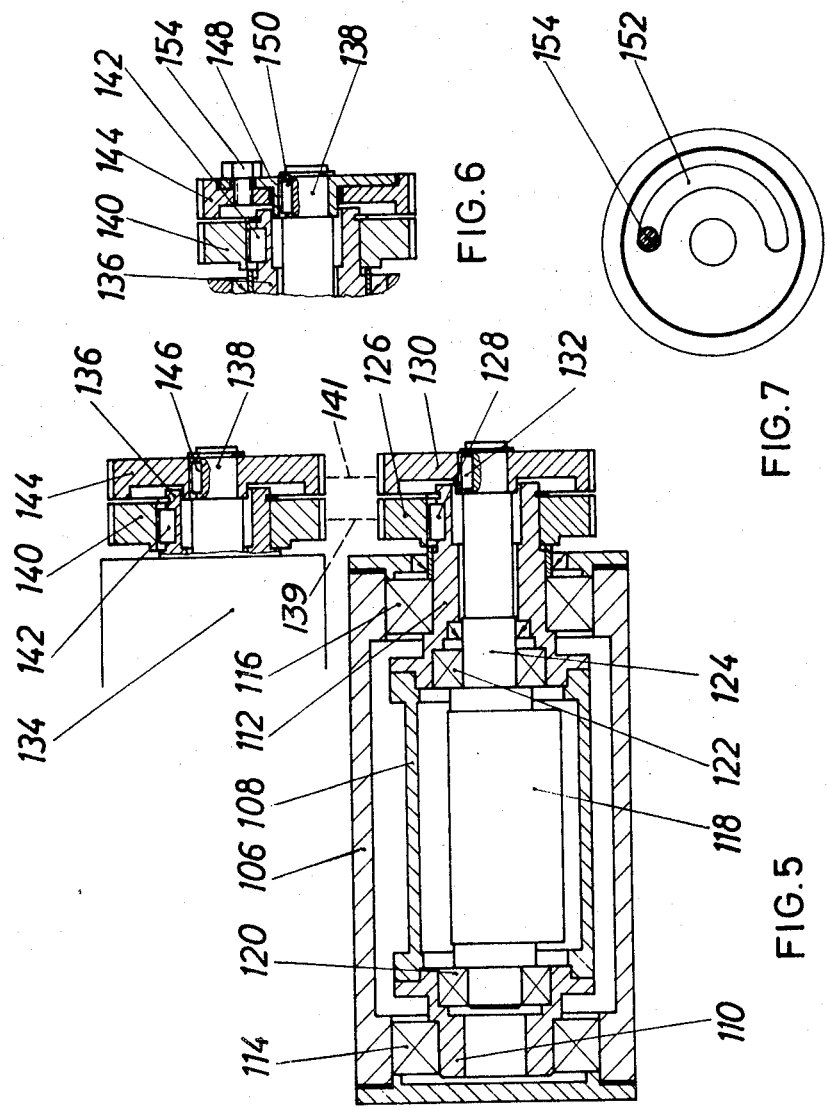

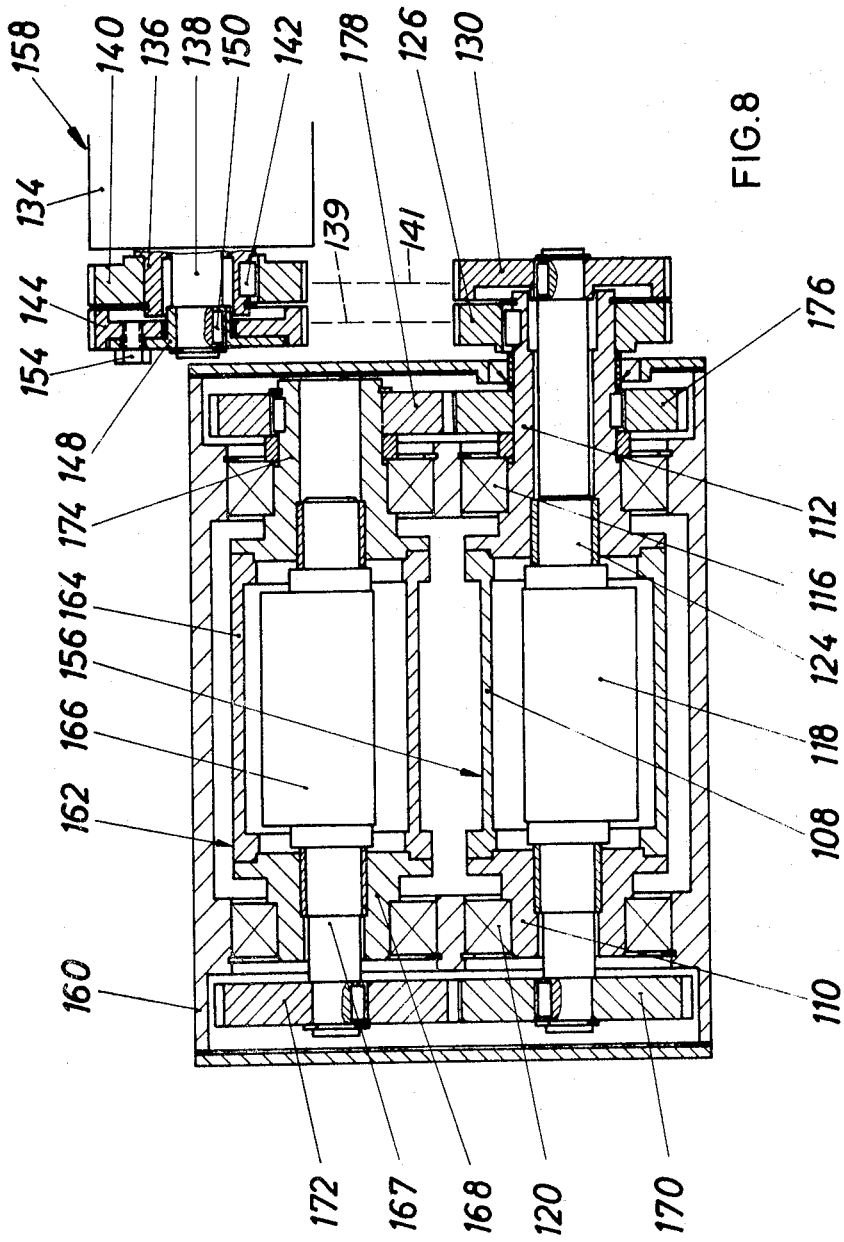

United States Patent Office 3,625,074
Patented Dec. 7, 1971

3,625,074
ECCENTRIC VIBRATOR
Hans-Georg Waschulewski and Helmut Erdmann, Dusseldorf, Germany, assignors to Losenhausen Maschinenbau Aktiengesellschaft, Dusseldorf-Grafenberg, Germany
Filed Apr. 21, 1969, Ser. No. 818,001
Claims priority, application Germany, Apr. 26, 1968,
P 17 58 226.2
Int. Cl. F16h 33/00
U.S. Cl. 74—61  7 Claims

ABSTRACT OF THE DISCLOSURE

An outer eccentric has hollow journals at opposite ends thereof which are rotatably mounted in a frame. An inner eccentric has shafts extending from each end thereof which are rotatably mounted in the hollow journals. In some embodiments there are a second corresponding pair of inner and outer eccentrics with the two outer eccentrics being geared together, and the two inner eccentrics being geared together. In some embodiments a driving pulley is secured to the distal end of a journal and a flange abutting the pulley is secured to the distal end of a shaft. The flange has an arcuate slot through which extends a stud bolt threaded into the pulley thereby enabling the angular position of the inner and outer eccentrics to be adjusted relative to each other. In some embodiments the distal ends of a hollow journal and a shaft have pulleys mounted thereon. A gear driving device has two concentric pulleys, one of which is belt connected to the pulley on the journal, and the other of which is belt connected to the pulley on the shaft. One of these two pulleys of the driving device can be adjusted to different angular positions about its axis.

BACKGROUND AND SUMMARY OF THE INVENTION

The invention relates to an eccentric vibrator having two rotating eccentrics which are adjustable relatively to one another and which are disposed coaxially of one another, the first eccentric extending around a second eccentric, the drive being through the agency of a pulley in driving engagement with one of the eccentrics, the first eccentric being mounted at both its ends in the casing through the agency of hollow journals, the shaft of the second and inner eccentric extending outwards through one of the hollow journals.

The eccentrics can so rotate that orbital vibrations are produced, in which event adjustment of the eccentrics relatively to one another alters the resultant eccentricity—i.e., the amplitude of the centrifugal force. If, however, the eccentrics rotate to opposite hands, directed vibrations operative in only a single plane are produced, and adjustment of the eccentrics relatively to one another alters the position of the plane in which the vibrations are produced.

It is an object of the invention so to devise an eccentric vibrator of the kind referred to that, although of simple construction, the eccentrics can readily be adjusted.

According to the invention, a shaft extending through the center of the pulley, is in driving engagement with the second eccentric, and bears at its end a clamping disc formed with an arcuate slot; and an axial clamping screw extends through the slot and is threaded into the pulley, to enable the clamping disc to be secured to the pulley in various relative angular positions.

It has been proposed in an eccentric vibrator of the kind referred to, to provide two shell-like eccentrics disposed coaxially one inside another which can be adjusted relatively to one another in operation, through the agency of a coarse screwthread on an axially adjustable spindle interconnecting the first and outer eccentric and the second and inner eccentric, the first eccentric having a drive pulley at its closed end. The spindle is connected by splining to the first eccentric so as to rotate solidly therewith but be axially movable therealong. The second eccentric is so disposed in the first eccentric as to be axially locatable and is guided on the coarse-screwthreaded spindle. Consequently, the first eccentric drives the second eccentric via the spindle, which can be moved axially to rotate the eccentrics relatively to one another. This is a very complicated arrangement. The eccentrics are open at one end, a feature which disturbs mechanical stability. There is no such feature as a casing like eccentric mounted at both its ends in the casing by means of hollow journals, nor does a shaft in driving engagement with the second eccentric extend through the pulley for connection thereto at various angles through the agency of a clamping disc (German patent specification 623,892).

In another proposed eccentric vibrator, a stirrup-shaped first eccentric is mounted at both its ends in the casing by means of hollow journals. A second and inner eccentric has its shaft mounted coaxially of such journals, the shaft extending at one end through one hollow journal. The hollow journal of the outer eccentric and the shaft of the inner eccentric are interconnected by gearing so that they can be rotated angularly relatively to one another, and a drive pulley is provided internally on the side remote from the gearing (German Utility Model 1,841,635). This arrangement is relatively complicated. A shaft which extends through the pulley, in combination with a clamping disc adapted to be clamped at various angles to the pulley, does not provide a simple means of adjusting a vibrator of this kind having coaxial eccentrics in the sense of the invention.

According to a still further proposed construction, to enable two eccentrics to be angularly adjusted relatively to one another, two coupling discs are provided, one of which is formed with an arcuate slot in which the clamping screw is guided and adapted to be clamped. This is not a compact vibrator having coaxial eccentrics and, unlike the construction of the invention, the feature of using a drive pulley for this adjustment in addition to its normal purpose is not provided.

The invention can be carried into effect in a variety of ways. For instance, the pulley can be disposed directly on one of the hollow journals for mounting the first eccentric in the vibrator casing, and the clamping disc is connected to the shaft of the second and inner eccentric. A driving motor can then drive the two eccentrics to the same hand via the pulley. By the pulley and the clamping disc being rotated relatively to one another, the angle between the eccentrics can be varied, so that the resultant centrifugal force is altered. The vibrator produces orbital vibrations.

Alternatively, the means for driving the eccentrics can comprise gearing having two output shafts in the form of a hollow shaft and, coaxially thereof, an inner shaft, one pulley each being disposed on such shafts; the inner shaft extends through the associated pulley and bears at its end the clamping disc which can be secured on the pulley at a variety of relative angles; and one pulley each is disposed on the hollow journal of the first eccentric and on the end of the shaft of the second eccentric, such end extending beyond the first eccentric, and each such pulley is in driving engagement with a respective pulley of the gearing.

In an arrangement of this kind the two eccentrics are driven to opposite hands via the pulley pairs, so that directed vibrations are produced. By altering the angular position relatively to one another of the pulley on the inner shaft and of the clamping disc rigidly connected to the inner shaft, the phase of the oppositely rotating eccentrics, and therefore the position of the plane of vibrations, can be varied. The oppositely rotating eccentrics produce, of course, directed vibrations whose plane depends upon the relative phase of the rotating eccentrics. The inner shaft is in driving engagement with one eccentric via the gearing and outer shaft, while the pulley on the inner shaft is in driving engagement with the other eccentric.

In both the cases described of an orbital vibrator and of a directional vibrator, a third eccentric and a fourth eccentric can be so mounted in a common vibrator casing as to be adjacent and parallel to the first eccentric and the second eccentric, the third eccentric is mounted through the agency of hollow journals in the vibrator casing and extends like a casing around the fourth eccentric whose shaft extends on one side through the hollow journal of the third eccentric to project there beyond, and the shaft of the second eccentric projects on the same side beyond the hollow journal of the first eccentric; and the first eccentric and the third eccentric are interconnected by gearing disposed on the hollow journals, and the second eccentric and the fourth eccentric are interconnected by gearing mounted on the projecting ends of their shafts.

When the first and second eccentrics are driven, after the fashion of the orbital vibrator described, via a single pulley, the resulting device is a directional vibrator wherein, without any change in the direction of the vibrations, the amplitude of the oppositely rotating resulting eccentrics is varied, so that the amplitude of the directed vibration varies. However, in the case of a directional vibrator wherein the first and second eccentrics are driven to opposite hands each via its own pulley, adjusting the pulley relatively to the gearing clamping disc alters the directions of the resultant vibrations but does not alter their amplitude. In this case too a resultant-directed vibration of unaltered direction of vibration but of variable resultant amplitude is obtained.

Substantially the same components are used for all the constructions described, thus considerably simplifying manufacture, since a relatively small number of standardised components suffice to produce a very wide variety of vibrators.

Embodiments of the invention will now be described by way of example with reference to the accompanying drawings in which:

FIG. 1 is a view in longitudinal section through an orbital vibrator according to one embodiment;

FIG. 2 is a view, looking from the left in FIG. 1, showing the pulley with the clamping disc and clamping screw;

FIG. 3 is a view in longitudinal section of a directional vibrator built up from two units as disclosed in FIG. 1;

FIG. 4 is a view from the left in FIG. 3 of the pulley and clamping disc used in FIG. 3;

FIG. 5 is a longitudinal section through a directional vibrator in accordance with a further embodiment;

FIG. 6 shows the mechanism for adjusting the vibration direction;

FIG. 7 is a view, looking on to the left-hand end of FIG. 6, of the pulley and clamping disc used in FIG. 6, and FIG. 8 is a view in longitudinal section through another form of construction comprising two directional vibrators of the kind shown in FIG. 5.

Referring to FIG. 1, the vibrator comprises a frame formed by casing 10 closed by two end members 12, 14. A first eccentric 20 has two hollow journals 22, 24, received in bearings 16, 18 respectively of the frame. Eccentric 20 surrounds a second eccentric 26 which has a shaft 28. Shaft 28 is mounted in bearings 30, 32 supported in the hollow journals 22, 24 of the first eccentric 20. Shaft 28 is positioned coaxially with hollow journals 22, 24. A pulley 30 is mounted on the journal 22 which extends out of casing 10 through end member 12, the pulley being secured to the journal by a key 30a. On its outer side remote from the end member 12 pulley 30 has a recess 32 receiving a disc 34. Disc 34 has a sleeve 34a surrounding the adjacent end of shaft 28 and the sleeve is secured to the shaft 28 by a key 36a. The two eccentrics are driven via pulley 30 and rotate to the same hand, so that the vibrations produced are orbital.

As shown in FIG. 2, disc 34 has a semi-circular aperture 36, and a clamping screw 38 extends therethrough and is screwed into pulley 30. Through the agency of screw 38 and aperture 36, disc 34 can be clamped in various angular positions relatively to pulley 30. The position of the two eccentrics 20, 26, relative to each other and therefore the resulting centrifugal force, can therefore be varied.

Referring now to FIG. 3, two units similar to the unit shown in FIG. 1 are disposed in a casing or frame 40, but only one of the units has a pulley 42. The first unit has a first eccentric 44 which, just like the eccentric 20 of the first embodiment, surrounds a second eccentric 46. Eccentric 44 is mounted in the casing through the agency of hollow journals 48, 50 received in bearings 52, 54. The second or inner eccentric 46 has a shaft 56 coaxially mounted in the journals 48, 50 through the agency of bearings or linings or the like 58, 60. Journal 48 extends laterally out of the casing 40 and bears a pulley 42. A clamping disc 64 is secured by a key 62 to the adjacent end of shaft 56 of the second eccentric 46 and, as can best be gathered from FIG. 4, is formed with a semi-circular aperture 66. Through the agency of a clamping screw 68, the clamping disc 64 can be connected to the pulley 42 at various angular positions thereto. Pulley 42 is rigidly secured by a key 70 to journal 48.

Another pair of eccentrics 72, 74 is mounted in the casing 40 parallel and adjacent to the eccentrics 44, 46. The third eccentric 72 has hollow journals 76, 78 via which the eccentric 72 is received in bearings 80, 82 in the casing 40. Coaxially of journals 76, 78, shaft 84 of eccentric 74 is mounted in bushes 86, 88 in such journals. A gearwheel 90 is mounted on journal 48 to which it is secured by key 92. A gearwheel 94 is disposed on journal 76 to which it is secured by a key 96. Gearwheel 94 meshes with gearwheel 90. At the opposite end or right hand end in FIG. 3, the shafts 56, 84 project beyond the journals 50, 78 respectively. Disposed on these projecting ends of the shafts 56, 84 are gearwheels 98, 100 each of which is keyed to the respective shafts 56 and 84 by keys 102 and 104 respectively. Consequently, the first eccentric and the third eccentric 72 rotate to opposite hands; similarly, the second and fourth eccentrics rotate to opposite hands. When the angular position of the first eccentric is varied relatively to the angular position of the second eccentric by adjustment of the disc 64, there is a corresponding variation of the angular position of the third eccentric relatively to the fourth eccentric. Since the elements forming a pair of eccentrics rotate to opposite hands in each case, the amplitudes of the oppositely rotating centrifugal forces, and therefore the resulting centrifugal force of the directed vibration, are varied.

Referring now to FIGS. 5-7, the vibrator has a casing 106 receiving in bearings 114, 116, hollow journals 110, 112 of a first eccentric 108 which surrounds a second eccentric 118 mounted, through the agency of a shaft 124 received in bearings 120, 122, in the first eccentric 108. Shaft 124 extends coaxially through hollow journal 112 and projects beyond the end thereof. Disposed on journal 112 is a pulley 126 which is keyed to journal 112 by key 128. A second pulley 130 is disposed on the projecting end of shaft 124 and keyed thereto by key 132.

A gearing 134 has two coaxial output shafts, one of which is a hollow shaft 136. An inner shaft 138 extends coaxially through hollow shaft 136 and projects therebeyond. The two shafts 136, 138 are driven via the gearing 134 to opposite hands but at the same speed. Disposed on hollow shaft 136 is a pulley 140 which is keyed to shaft 136 by a key 142. A second pulley 144 is disposed on the projecting end of shaft 138 and keyed thereto by key 146. The pulley 126, and therefore the first eccentric 108, are driven by a belt 141 from the pulley 140. The pulley 130, and the second and inner eccentric 118, are driven via the pulley 144, in the opposite direction with respect to the first eccentric. Directed vibrations are therefore produced.

To vary the plane of the directed vibrations, the pulleys driven by the gearing 134 can be devised in the manner shown in FIGS. 6 and 7. Like elements have the same references in FIGS. 6 and 7 as in FIG. 5. In FIGS. 6 and 7, pulley 144 is not directly keyed to inner shaft 138 of the gearing 134; instead, a clamping disc 148 is keyed to inner shaft 138 by key 150 and, as can be seen in FIG. 7, is formed with a semicircular aperture 152 through which a clamping screw 154 extends, screw 154 being screwed into pulley 144. The semi-circular aperture 152 and screw 154 enables the pulley 144 to be connected to inner shaft 138 at various angular positions relatively thereto. If screw 154 is slackened and clamping disc 148 rotated relatively to pulley 144, the relative angular position between the first eccentric 108 and the second eccentric 118 can be varied, so that the plane of the directed vibrations alters.

The arrangement shown in FIG. 8 comprises two units of the kind shown in FIG. 5. Like elements have the same references in FIG. 8 as in FIGS. 5 and 6. One unit having two eccentrics 108, 118 and devised after the fashion of FIG. 5 has the general reference 156 in FIG. 8. Its two pulleys 126, 130 are driven to opposite hands by a transmission and pulley unit 158 after the fashion of FIG. 6, the relative angular position of the eccentrics being variable by adjustment of clamping disc 148 relatively to pulley 144. A similar eccentric unit is mounted in a casing 160 adjacent and parallel to the unit 108, 118 and has the general reference 162. The unit 162 comprises a third eccentric 164 and a fourth and inner eccentric 166. In contrast to the system shown in FIG. 5, the shafts 124 of the inner eccentrics 118, 166 are not, on the left-hand side of FIG. 8, embodied merely as journals but are prolonged beyond the hollow journals 110, 168 of the outer eccentrics 108, 164 respectively. Gearwheels 170, 172 are disposed on the projecting ends of the shafts 124, 167 respectively of the inner eccentrics. Consequently, the inner shafts and the inner eccentrics 118, 166 are interconnected so as to rotate to opposite hands. Disposed on the right-hand (in FIG. 8) hollow journals of the outer eccentrics 108, 164—i.e., the hollow journal 112 and a hollow journal 174 respectively—are gearwheels 176, 178 which so interconnect the outer eccentrics 108, 164 that the same rotate to opposite hands. Each pair 108, 118 and 164, 166 of eccentrics produces a directed vibration, since the individual eccentrics of a pair rotate to opposite hands. Because of the provision of the gearwheels 170, 172 and 176, 178, a rotation of the relative position of the eccentrics 108, 118 through the agency of the clamping disc 148 produces a relative rotation, but to the opposite hand, of the eccentrics 164, 166. Consequently, when the clamping disc 148 is adjusted in this way, the vibration planes of the two eccentric systems 156, 162 are altered in opposite directions. The resultant plane of vibration therefore stays the same, but the amplitude of the resultant vibration alters. Consequently, the system shown in FIG. 8 also provides a directional vibrator having variable vibration amplitude.

We claim:

1. In an eccentric vibrator apparatus comprising a frame, a first pair of eccentrics including an outer eccentric rotatably mounted in the frame and an inner eccentric rotatably mounted in the outer eccentric coaxial with the outer eccentric, and driving means connected to the eccentrics to rotate the same, the improvement comprising:
   said outer eccentric having hollow journals at each end thereof, said journals being rotatably mounted in said frame;
   said inner eccentric including a shaft extending from each end thereof, said shafts being rotatably mounted in said hollow journals; and
   said driving means including a driving member and a flange member positioned side by side and coaxially with respect to each other, a first of said members having an arcuate slot extending therethrough, and a clamping bolt extending through said slot and threaded into the second of the members, whereby by loosening the bolt the relative angular position of the two members with respect to each other may then be adjusted with the bolt thereafter being retightened to retain the relative angular position thus established;
   one of said members being mounted on and secured to said shaft and the other of said members being mounted on and secured to one of said hollow journals.

2. In an eccentric vibrator apparatus comprising a frame, a first pair of eccentrics including an outer eccentric rotatably mounted in the frame and an inner eccentric rotatably mounted in the outer eccentric coaxial with the outer eccentric, and driving means connected to the eccentrics to rotate the same, the improvement comprising:
   said outer eccentric having hollow journals at each end thereof, said journals being rotatably mounted in said frame;
   said inner eccentric including a shaft extending from each end thereof, said shafts being rotatably mounted in said hollow journals; and
   said driving means including a driving member and a flanged member positioned side by side and coaxially with respect to each other, a first of said members having an arcuate slot extending therethrough, a clamping bolt extending through said slot and threaded into the second of the members, whereby by loosening the bolt the relative angular position of the two members with respect to each other may then be adjusted with the bolt thereafter being retightened to retain the relative angular position thus established, said driving means comprising a gearing device having two concentric output shafts, a first pair of rotating members, one rotating member of said first pair being on one of said output shafts, said driving member comprising the second rotating member of the first pair, said flange member being mounted on and secured to the second output shaft, a second pair of rotating members comprising a third rotating member mounted on and secured to one of said hollow journals and a fourth rotating member mounted on and secured to one shaft of the inner eccentric, flexible power transmission means connecting one rotating member of each pair of rotating members, and flexible power transmission means connecting the other rotating member of each pair of rotating members.

3. In an apparatus as set forth in claim 2, wherein said shafts extend beyond the respective ends of said two journals, and including a second pair of eccentrics including a second outer eccentric and a second inner eccentric coaxial with said second outer eccentric, said second outer eccentric having hollow journals at each end thereof and rotatably mounted in the frame, said second inner eccentric having a shaft extending from each end thereof and rotatably mounted in the hollow journals of the second outer eccentric, gearing means connecting the two outer eccentrics, and gearing means connecting the two inner eccentrics.

4. In an apparatus as set forth in claim 3, wherein the gearing means connecting two eccentrics causes said two eccentrics to rotate in opposite directions.

5. In an eccentric vibrator apparatus comprising a frame, a first pair of eccentrics including an outer eccentric rotatably mounted in the frame and an inner eccentric rotatably mounted in the outer eccentric coaxial with the outer eccentric, and driving means connected to the eccentrics to rotate the same, the improvement comprising:

said outer eccentric having hollow journals at each end thereof, said journals being rotatably mounted in said frame;

said inner eccentric including a shaft extending from each end thereof, said shafts being rotatably mounted in said hollow journals and extending beyond the respective ends of said two journals;

said driving means including a driving member and a flange member positioned side by side and coaxially with respect to each other, a first of said members having an arcuate slot extending therethrough, and a clamping bolt extending through said slot and threaded into the second of the members, whereby by loosening the bolt the relative angular position of the two members with respect to each other may then be adjusted with the bolt thereafter being retightened to retain the relative angular position thus established;

a second pair of eccentrics including a second outer eccentric and a second inner eccentric coaxial with said second outer eccentric, said second outer eccentric having hollow journals at each end thereof and rotatably mounted in the frame, said second inner eccentric having a shaft extending from each end thereof and rotatably mounted in the hollow journals of the second outer eccentric;

gearing means connecting the two outer eccentrics; and gearing means connecting the two inner eccentrics.

6. In an apparatus as set forth in claim 5, wherein the gearing means connecting two eccentrics causes said two eccentrics to rotate in opposite directions.

7. In an apparatus as set forth in claim 5, wherein one of said members is mounted on and secured to one of said shafts and the other of said members is mounted on and secured to the respective hollow journal.

References Cited

UNITED STATES PATENTS

| | | | |
|---|---|---|---|
| 1,476,892 | 12/1923 | Jaeger | 198—220 |
| 2,214,755 | 9/1940 | Tafel | 198—220 |
| 2,216,318 | 10/1940 | Lewis | 74—568 |
| 2,456,248 | 12/1948 | Berry | 209—326 |
| 2,950,819 | 8/1960 | Holman et al. | 209—332 |
| 105,605 | 7/1870 | Stratton | 74—571 |
| 2,937,537 | 5/1960 | Woll | 74—571 |

WILLIAM F. O'DEA, Primary Examiner

W. S. RATLIFF, JR., Assistant Examiner

U.S. Cl. X.R.

198—220; 209—332